Patented May 30, 1939

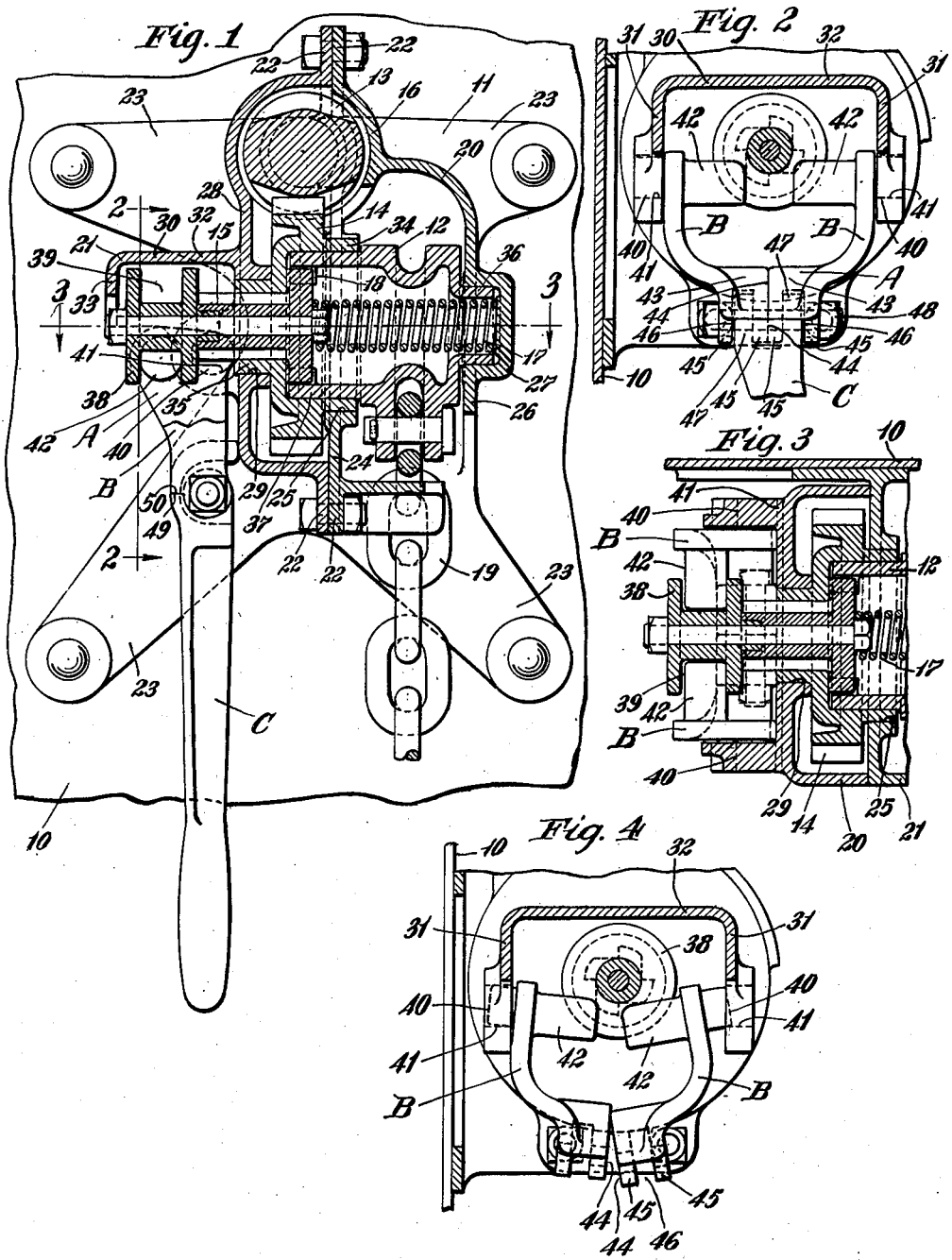
May 30, 1939. R. J. OLANDER 2,160,279
HAND BRAKE
Filed Jan. 25, 1937
Inventor
Roland J. Olander
By Henry Fuchs
Atty.

2,160,279

UNITED STATES PATENT OFFICE 2,160,279

HAND BRAKE

Roland J. Olander, Chicago, Ill., assignor to W. H. Miner, Inc., Chicago, Ill., a corporation of Delaware Application January 25, 1937, Serial No. 122,149

9 Claims. (Cl. 192—82)

This invention relates to improvements in hand brakes, and more particularly to improvements in hand brakes of the worm gear operated type, comprising chain winding means and hand wheel operated actuating mechanism, wherein the actuating mechanism is operatively connected to the winding mechanism for the brake chain by releasable clutch means to permit quick release of the brakes without spinning of the hand wheel.

One object of the invention is to provide a worm operated brake mechanism of the character specified, enclosed within a housing, lever means pivoted in a one piece integral section of the housing for actuating the clutch means, wherein the lever means is so designed that it can be readily and quickly assembled within the one piece section of the housing in cooperative relation with the clutch means without dismantling the sections of the housing.

A more specific object of the invention is to provide a unitary shifting lever mechanism, especially adapted for actuating the clutch means for operatively connecting the winding means to the actuating mechanism of a worm gear operated hand brake, composed of a plurality of separable sections to facilitate assembling of the clutch shifting lever mechanism with the cooperating parts of the hand brake.

A further object of the invention is to provide a hand brake mechanism of the worm gear operated type having clutch means operatively connecting the worm driven actuating means to the winding mechanism of the brakes, a shifting lever for actuating the clutch means, and a housing enclosing the parts of the brake mechanism, wherein the shifting lever means has a shifting head portion provided with a pair of trunnions rotatably mounted in bearing seats formed in the housing and permanently fixed with respect to each other, the head portion being composed of two separable sections, each provided with one of said trunnions whereby said lever means is adapted to be readily assembled with the housing when the sections of the head are disconnected from each other and is definitely and permanently held in operative assembled position in said housing with the trunnions thereof securely held in the seats with the sections of the head securely clamped together.

Other objects of the invention will more clearly appear from the description and claims hereinafter following.

In the drawing forming a part of this specification, Figure 1 is a vertical sectional view of a hand brake mechanism of the worm gear actuated type, illustrating my improvements in connection therewith, the brake mechanism being illustrated as mounted on the end wall of a car, said end wall being broken away and the section through the brake mechanism being in a plane parallel to said end wall. Figure 2 is a vertical sectional view, corresponding substantially to the line 2—2 of Figure 1. Figure 3 is a horizontal sectional view, corresponding substantially to the line 3—3 of Figure 1. Figure 4 is a view similar to Figure 2 with the operating handle detached and illustrating the mode of assembling the shifting mechanism with the housing and cooperating parts of the brake mechanism.

In said drawing, 10 indicates the vertical end wall of a railway car on which is mounted the hand operated worm gear actuated mechanism 11. The brake mechanism illustrated is similar to that disclosed in Patent No. 1,974,581, granted to me September 25, 1934, and operates in a like manner. The brake mechanism 11 includes a chain winding drum 12, a worm 13, a worm wheel 14, a sliding clutch element 15, and means for shifting the clutch. The parts of the brake mechanism are all enclosed in a housing 16 and the worm 13 is manually rotated by a hand wheel (not shown) exterior to the housing. The worm 13 meshes with the worm wheel 14 and imparts rotary movement to the latter. The clutch element 15 serves to operatively connect the winding drum 12 to the worm wheel 14 and rotary movement of the drum is thus effected when the hand wheel is rotated. The clutch element 15 is held operatively engaged with the clutch means of the drum 12 by a spring 17 contained within the hollow portion of said drum. The clutch means on the drum comprises an annular series of interior projections or teeth 18 which cooperate with similar projections or teeth on the clutch element 15. The clutch element 15 is splined to the worm wheel 14 to rotate in unison therewith. The chain which leads to the brake mechanism proper of the car is indicated by 19 and is fixed to the drum to be wound on the latter in the usual manner.

The worm gear operated mechanism comprising the drum 12, the worm 13, the worm wheel 14, and the clutch element 15 is similar to the brake mechanism described in Patent No. 1,974,581 hereinbefore referred to and forms a part of the present invention only insofar as the same cooperates with my improvements and therefore needs no further detailed description.

In carrying out my invention, I provide a sectional housing for the brake mechanism and a clutch shifting means of improved construction, which is particularly designed for the type of housing I employ. The improved clutch shifting means comprises broadly a pivoted forked head member A composed of separable sections B—B, and an actuating lever C pivotally connected to the head A.

The improved housing which is broadly indicated by 16 is vertically divided into two hollow sections 20 and 21. Each section is preferably in the form of a casting. The housing section 20, as clearly shown in Figure 1, is open at the bottom to accommodate the brake chain 19 for movement. At their meeting edges the housing sections 20 and 21 have integral flanges 22—22 which are bolted together to hold the sections assembled. Each section is also provided with ears 23—23 by which the housing is fixed to the end wall 10 of the car. The housing 16 is further provided with a vertical partition wall 24 dividing the same into two compartments. This wall is in a plane at right angles to the car wall 10 and is formed integral with the housing section 20. The wall 24 is provided with a bearing seat 25 for the worm wheel 14. At the right hand end, as viewed in Figure 1, the housing section 20 has a vertical side wall 26 parallel to the partition wall 24, and said wall 26 is formed with a hollow outwardly projecting cylindrical boss 27 forming a bearing for the right hand end of the chain drum 12, said bearing being concentric with the bearing seat 25.

The housing section 21 has a vertical side wall 28 parallel to the partition wall 24 and said wall 28 is provided with a cylindrical bearing opening 29 concentric with the bearing seats 25 and 27. The housing section 21 is further provided with an extension 30 at the left hand side thereof, as viewed in Figure 1, said extension being in alignment with the bearing opening 29. The extension 30 is formed integral with the section 21 and has spaced side walls 31—31, a top wall 32, and an outer end wall 33. As will be evident, the extension 30 is thus in the form of a hoodlike member which is open at the bottom. As shown clearly in Figure 1, the top portions of the sections 20 and 21 of the housing 16 are formed to provide a substantially cylindrical chamber which accommodates the worm 13, said chamber being open at the bottom and communicating with the interior of the main body portion of said housing.

The worm 13 is suitably journaled in the housing for rotary movement in any well-known manner, and preferably has journal portions seated in bearings in the front and rear walls of the housing 16. The worm wheel 14 has hollow cylindrical hub portions 34 and 35 at opposite sides thereof journaled respectively in the bearings 25 and 29. The chain winding drum 12 is also provided with hollow cylindrical hub portions at opposite ends thereof, indicated by 36 and 37, which are journaled respectively in the bearing 27 and the interior of the hollow hub 34 of the worm wheel 14.

The clutch element 15, which is slidingly mounted in the hub 35 of the worm wheel 14, extends into the hoodlike extension 30 of the housing section 21, as clearly shown in Figure 1, and said extension of the clutch element is provided with a spoollike section 38 at the outer end thereof having an annular groove 39 to cooperate with means for shifting the clutch element.

The clutch shifting means comprising the forked head A and the pivoted handle lever C is swingingly mounted in the hood portion 30 of the housing section 21 by laterally outstanding projecting trunnions 40—40 on said head, rotatably supported in transversely aligned bearing openings or seats 41—41 provided in the side walls 31—31 of the hood section 30. The sections B—B of the head A respectively form the arms of the forked portion of said head and the trunnions 40—40 are formed respectively on said sections at the upper ends of the arms. Each section B is further provided with an inwardly projecting trunnion 42 at the upper end of the arm thereof, the trunnion 42 being eccentric to the trunnion 40. The trunnions 42—42 of the two sections B—B of the head A are in transverse alignment and are engaged within the groove 39 of the spool 38 of the clutch element 15. The lower end portions of the sections B—B are offset inwardly toward each other, as clearly illustrated in Figure 2, said offset portions, which are indicated by 43—43, being thickened to provide a relatively large bearing connection for the handle lever C. The thickened portions 43—43 have substantially flat, vertically disposed, contacting faces 44—44 of relatively large area on the inner sides thereof. The lower section of the portion 43 of each section B is vertically slotted, thereby providing a pair of spaced depending ears 45—45 having an opening 46 therebetween. As shown most clearly in Figure 2, the innermost ears of the sections B—B are in abutment with each other when the sections of the head are secured together, thereby providing, in effect, a central ear composed of two of the ears 45—45. The head is thus provided with three spaced ear portions, two outer ears 45—45 and a central ear composed of two ear members 45—45.

The operating handle lever C is forked at the upper end, thus providing spaced ears 47—47 which are engaged within the openings 46—46 of the head A between the outermost ears 45—45 and embracing the central ears 45—45. The ears 47—47 of the handle lever C have a loose fit in the openings 46—46 so that the handle may freely pivot on the head without binding of the parts. The handle C is pivotally secured to the head A by a bolt 48 which extends through aligned openings in the ears 47—47 of the handle C and the ears 45—45 and 45—45 of the sections B—B of the head A. In addition to providing the pivot for the handle C, the bolt 48 further serves to securely clamp the sections B—B of the head A together. As clearly indicated in Figure 1, the handle lever C and the head A are provided with cooperating abutment shoulders 49 and 50 which limit swinging movement of the handle lever to the left with respect to the head.

In assembling my improved clutch shifting lever means with the other parts of the brake mechanism, the sections B—B of the head A of the shifting means in detached condition from the handle lever C and separated from each other are placed within the hood 30 of the housing section 21 by first entering either one of said sections B—B into the hood 30 in tilted condition and engaging the trunnion 40 thereof in the bearing opening 41 of the corresponding side wall 31 of the hood 30. This operation is illustrated in Figure 4, the left hand section B being the first section entered within the hood. This section is then permitted to tilt slightly as shown in said figure to provide clearance for application of the right hand section B. This last named section is then entered within the hood 30 in the tilted position shown in Figure 4 and the trunnion 40 thereof engaged within the opening 41 of the right hand side wall of the hood. The lower ends of the sections B—B are then forced together to bring these sections to substantially the position shown in Figure 2, thereby fully seating the trunnions 40—40 in the bearing openings 41—41 and bringing the portions 43—43 at the lower ends of the sections B—B into intimate contact. The handle lever C is then assembled with the head A by entering the ears 47—47 of the forked portion of the handle lever into the bearing openings 46—46 of the sections B—B. The sections are then tightly clamped together by the bolt 48, which is engaged through the ears of the sections B—B and the handle lever C, thereby also pivotally connecting the handle lever C to the head A.

As will be evident, when the parts or sections B—B of the head A are securely clamped together by the bolt 48, the united sections form a substantially rigid unit serving as the shifting head of the lever mechanism. It is further pointed out that the pivotal connection provided between the head A and the hood 30 by means of the trunnions 40—40, together with the bolt, at all times serves to positively maintain the section against relative rotation about the axis of the bolt. The parts are so proportioned that slight clearance is provided between the arms of the forked portion of the head A and the inner faces of the walls 31—31 of the hood 30 of the housing 16 when the sections B—B are securely clamped together, thereby permitting a certain limited amount of play between these parts during the assembling operation to facilitate entering the sections B—B into the hood 30, as hereinbefore described.

The operation of the improved clutch shifting means is as follows: To release or disengage the drum from operative relation with the worm wheel, the operating handle lever C is swung to the left, as viewed in Figure 1, thereby through the shouldered engagement of the handle lever C with the head A swinging the head in a clockwise direction on its trunnions 40—40. Inasmuch as the trunnions 42—42 of the head A are engaged with the spool portion of the clutch element 15 and as the trunnions 42—42 are eccentric with respect to the trunnions 40—40, the swinging movement of the head A imparts movement to the clutch element 15 in a right hand direction or inwardly of the drum 12, thereby disengaging the clutch element 15 from the cooperating clutch means of the drum 12 and releasing the drum from the worm wheel to permit free rotation of the drum to release the brakes. When the operator lets go of the handle lever C, the latter returns to pendant position by the action of gravity, swinging on the pivotal connection between the handle lever and the head A. The clutch element 15 is automatically restored to its engaged position by the action of gravity on the head A of the shifting mechanism augmented by the weight of the handle lever C and further assisted by the expansive action of the restoring spring 17.

I have herein shown and described what I now consider the preferred manner of carrying out my invention, but the same is merely illustrative and I contemplate all changes and modifications that come within the scope of the claims appended hereto.

I claim:

1. In a clutch shifting means for a sliding clutch element connecting the rotary chain winding mechanism and the rotary driving mechanism of a hand brake, the combination with a housing enclosing said mechanisms, said housing having an extended hood portion provided with rigidly spaced side walls formed integral with the remainder of said hood portion said walls having aligned bearing openings; of clutch shifting lever means operatively connected to said clutch element, said lever means including a split head comprising two similar sections embraced between said walls, each having a laterally, outwardly projecting trunnion thereon integral therewith, said trunnions being pivoted respectively in the openings of said side walls respectively of said hood portion.

2. In a mechanism for shifting a sliding clutch element connecting rotary driven and driving means, the combination with a support for said means having permanently connected rigid spaced side walls embracing said clutch element and between which the latter is slidable; of aligned complete trunnion seats in said walls, each of said seats being integral with the corresponding wall; and a shifting member including a head composed of complementary separable sections and means clamping said sections together, each of said sections including an arm portion interposed between the clutch element and the corresponding side wall of the support, said arm portion having inner and outer trunnions thereon integral therewith, the inner trunnions of said arms engaging the clutch element to operatively connect the same to said head and the outer trunnions extending into and being seated in said trunnion openings to support said head for swinging movement.

3. In a mechanism for shifting a sliding clutch element, the combination with lever means for shifting said clutch element; of means for pivotally supporting said lever means including spaced trunnion supports all parts of which are in permanently fixed relation with respect to each other, said supports being at opposite sides of said clutch element; a head having spaced arms providing a fork, said arms being separable from each other and embracing said element on opposite sides thereof, said arms being embraced between said trunnion supports, said arms being operatively connected to said clutch element; fixed laterally extending trunnions on said arms integral with the latter and engaged in said trunnion supports; and means for detachably clamping said arms together.

4. In a mechanism for shifting a sliding clutch element provided with a grooved spool portion, the combination with a supporting member provided with laterally spaced bearing seats all parts of which are permanently fixed with respect to each other; of lever means for shifting said clutch including a pair of spaced separable arms, means for rigidly clamping said arms together, said arms embracing the spool of the clutch element and being embraced between said bearing seats, each arm having interior and exterior trunnions integral therewith, said interior and exterior trunnions being seated respectively within the groove of said spool and the corresponding bearing seat of said supporting member.

5. In a shifting mechanism for a reciprocating rotary clutch element having an annular groove therein, the combination with supporting means having spaced fixed trunnion seats all parts of which are permanently fixed with respect to each other; of a split shifting member comprising complementary sections, each having an arm portion, said sections having abutting portions; a bolt detachably clamping said abutting portions together, said arms being disposed between said trunnion seats and having their free ends spaced apart and disposed on opposite sides of said clutch element; and inner and outer trunnion members on each arm at the free end thereof, said trunnion members being integral with said arm, said trunnion members being engaged respectively within the groove of said clutch element and the corresponding trunnion seat.

6. In a shifting means for a reciprocating rotary clutch element, the combination with a support having laterally spaced bearing seats; of a two-part shifting head composed of complementary separable sections; trunnion means on said head rotatably supported in said bearing seats; means on said head operatively connecting the same to the clutch element to effect reciprocation of the latter; an actuating handle; and a bolt pivotally connecting the handle to said complementary sections of the head and rigidly clamping said sections together.

7. In a shifting means for a reciprocating clutch element, the combination with a shifting lever, comprising a handle member having one end forked, a pair of arms having bearing openings respectively accommodating the members of said forked portion of the handle member, and a bolt pivotally connecting said forked portion to said arms and clamping said arms together; of means pivotally supporting the arms of said lever for swinging movement; means operatively connecting said arms to the clutch element; and means for limiting relative pivotal movement between said handle and arms.

8. In a shifting means for a reciprocating clutch element, the combination with a longitudinally split operating fork; of means clamping the sections of said fork together, said fork engaging the clutch element to reciprocate the same; trunnions on opposite sides of said fork, each trunnion being integral with the corresponding section of said fork; and relatively fixed bearing supports for said trunnions, said supports embracing the fork at opposite sides, and each support having a continuous permanent bearing wall surrounding the corresponding trunnion.

9. In a clutch shifting means for a sliding clutch element connecting the rotary chain winding mechanism and the rotary actuating mechanism of a hand brake, the combination with a housing enclosing said mechanism, said housing having a hood portion thereon provided with spaced, permanently connected, fixed side walls having aligned trunnion seats therein defined by continuous cylindrical bearing walls integral with said hood walls; of a clutch shifting lever means operatively connected to said clutch element, said lever means including a split bearing head embraced between said hood walls and composed of a pair of separable complementary sections, means for clamping said sections together, and integral, laterally outwardly projecting trunnions on said sections respectively engaged within said trunnion seats.

ROLAND J. OLANDER.